United States Patent
Breuker et al.

(10) Patent No.: US 7,093,972 B2
(45) Date of Patent: Aug. 22, 2006

(54) TRI-TILT MIXING HEAD

(75) Inventors: Gordon W. Breuker, Holland, MI (US); Mark D. Robinson, Fennville, MI (US)

(73) Assignee: MHR, Inc., Holland, MI (US)

( * ) Notice: Subject to any disclaimer, the term of this patent is extended or adjusted under 35 U.S.C. 154(b) by 190 days.

(21) Appl. No.: 10/600,777

(22) Filed: Jun. 20, 2003

(65) Prior Publication Data
US 2004/0257908 A1    Dec. 23, 2004

(51) Int. Cl.
*B01F 5/04*    (2006.01)
*B29B 7/76*    (2006.01)

(52) U.S. Cl. .................... 366/162.5; 422/133
(58) Field of Classification Search ............ 366/159.1, 366/162.4, 162.5, 167.1, 173.1, 138; 422/131, 422/133–135
See application file for complete search history.

(56) References Cited

U.S. PATENT DOCUMENTS

| | | | | |
|---|---|---|---|---|
| 4,115,299 A | * | 9/1978 | Muhle | 422/133 |
| 4,440,500 A | * | 4/1984 | Schneider | 366/162.5 |
| 4,473,531 A | * | 9/1984 | Macosko et al. | 366/162.5 |
| 5,063,027 A | * | 11/1991 | Schneider | 422/133 |
| 5,540,497 A | * | 7/1996 | Addeo et al. | 422/133 |
| 6,297,342 B1 | | 10/2001 | Schulte et al. | |
| 6,527,431 B1 | | 3/2003 | Chen et al. | |

FOREIGN PATENT DOCUMENTS

| | | | |
|---|---|---|---|
| DE | 10121497 A1 | * | 7/2005 |
| JP | 2-261608 | * | 10/1990 |

* cited by examiner

*Primary Examiner*—Charles E. Cooley
(74) *Attorney, Agent, or Firm*—Price, Heneveld, Cooper, DeWitt & Litton, LLP

(57) ABSTRACT

A mixing head assembly comprising a housing having an input mix chamber passageway and a non-perpendicular output passageway. The assembly also includes a first input including a first nozzle for injecting a first fluid into the input mix chamber passageway and a second nozzle for injecting a second fluid into the input mix chamber passageway whereby the second fluid can mix with the first fluid to form a mixed fluid. The first nozzle and the second nozzle are configured to inject the first fluid and the second fluid into the input mix chamber passageway such that the first fluid and the second fluid meet at an intersection point. The first axial line and the second axial line are neither co-linear nor co-planar. Furthermore, an intersection point of the first fluid and the second fluid is not located along a longitudinal axis of the input mix chamber passageway.

39 Claims, 5 Drawing Sheets

US 7,093,972 B2

TRI-TILT MIXING HEAD

BACKGROUND OF THE INVENTION

The present invention relates to a mixing head assembly, and in particular to a mixing head assembly for mixing polyol and isocyanate to form high quality polyurethane foam.

Polyol and isocyanate are mixed to form polyurethane foam. The polyurethane foam is then placed into a mold to form polyurethane objects. Polyurethane foams can be used in a number of industries for a number of purposes. For example, rigid polyurethane foams are used in the auto and other industries for structural reinforcement, preventing corrosion and damping sound and vibration. Rigid polyurethane foams are also used as refrigeration and cooler insulation. Furthermore, flexible polyurethane foams can be used in seating cushions, arm rests and in other similar applications.

Heretofore, polyurethane foam producing methods, including structural reaction injection molding and reinforced reaction injection molding, have been used to produce flexible or rigid foam. Polyurethane foam has been made using low pressure foaming processes and high pressure foaming processes. In a low pressure foaming process, after reactive components are introduced at a low pressure into a mixing chamber through a nozzle, the components are mixed by high-speed rotation of an impeller, and are introduced into a molding. However, due to economical and environmental factors such as cleaning, mixture loss, inferior working conditions, bad quality or the like, the low pressure foaming process has typically been replaced with the high pressure foaming process. Meanwhile, the high pressure foaming process typically includes injecting reactive components at a high pressure by a nozzle to mix the reactive components by an impingement force. Thereafter, the mixture is introduced into the molding apparatus to form an object. The system for performing the high pressure foaming process typically comprises a tank for polyol, a tank for isocyanate, pumps for pumping the polyol and isocyanate, a mixing head assembly, a driving hydraulic unit, and an electronic control unit. The mixing head assembly introduces and mixes the reactive components, which is a major part for determining the quality of the final foam product.

Typical mixing head assemblies inject the reactive components in a horizontal or vertical direction. However, several methods have been proposed for improving the mixing efficiency and laminar flow at a discharging port by providing a swirl inducing chamber or an additional device. However, since the typical mixing head has a complicated construction, there are some drawbacks, such as difficulty of the maintenance, expensive manufacturing price and shortening of life cycle.

FIGS. 5–7 illustrate a typical mixing head assembly 10. The mixing head assembly 10 includes a mixing chamber 12. The polyol and isocyanate are injected into the mixing chamber 12 through a first nozzle 16 and a second nozzle 18. In use, the typical mixing head assembly 10 is connected to a hydraulic tank and to polyol and isocyanate feed lines (not shown). When a pump of the hydraulic tank is operated, a cleaning piston rod 20 is retracted from a discharge pipe 14 of the mixing chamber 12 and a mixing chamber piston rod 22 is retracted from the mixing chamber 12. Concurrently, the first nozzle 16 and the second nozzle 18 are opened to inject polyol and isocyanate at an initial high pressure of 120 to 200 bar into the mixing chamber 12.

Since the polyol and isocyanate are injected into the mixing chamber 12 in the form of opposing and impinging jets through the first nozzle 16 and the second nozzle 18, the polyol and isocyanate impinge primarily on each other. Furthermore, the first nozzle 16 and the second nozzle 18 could have axes that are neither co-linear nor co-planar. Accordingly, in this situation, the typical mixing head assembly 10 is considered to be a "dual-tilt" mixing head. The dual-tilt mixing head forces the jets of polyol and isocyanate to impinge secondarily on a wall of the mixing chamber 12, thereby forming a first swirl due to the impinging energy. The mixture consisting of the polyol and the isocyanate is passed from the mix chamber 12 to the discharge pipe 14 to form a second swirl. The mixture is passed from the mix chamber 12 to the larger diameter discharge pipe 14 to form a laminar flow, and then is introduced into the mold. After a predetermined amount of the mixture is introduced into the mold, the mixing chamber piston rod 22 extends to move the mixture out of mix chamber 12 and into the discharge pipe 14. Thereafter, the cleaning piston rod 20 is extended to move the mixture out of the discharge pipe 14 and into the mold, thereby completing the pouring process of the two mixed components from the mixing head assembly 10 into the mold.

Accordingly, a mixing head assembly solving the aforementioned disadvantages and providing an improved mixing of the reactive components is desired.

SUMMARY OF THE INVENTION

One aspect of the present invention is to provide a mixing head assembly comprising a housing having an input mix chamber passageway and an output passageway, with the input mix chamber passageway communicating with the output passageway. The mixing head assembly also includes a first input for injecting a first fluid into the input mix chamber passageway, with the first input including a first nozzle configured to inject the first fluid into the input mix chamber passageway. The mixing head assembly further includes a second input for injecting a second fluid into the input mix chamber passageway whereby the second fluid can mix with the first fluid to form a mixed fluid. The input mix chamber passageway is non-perpendicular to the output passageway.

Another aspect of the present invention is to provide a mixing head assembly comprising a housing having an input mix chamber passageway and an output passageway, with the input mix chamber passageway communicating with the output passageway. The mixing head assembly also includes a first nozzle for injecting a first fluid into the input mix chamber passageway and a second nozzle for injecting a second fluid into the input mix chamber passageway, whereby the second fluid can mix with the first fluid to form a mixed fluid. The first nozzle is configured to inject the first fluid into the input mix chamber passageway along a first axial line. The second nozzle is configured to inject the second fluid into the input mix chamber passageway along a second axial line. The first nozzle and the second nozzle are configured to inject the first fluid and the second fluid into the input mix chamber passageway such that the first fluid and the second fluid meet at an intersection point. The first axial line and the second axial line are neither co-linear nor co-planar. The intersection point is not located along a longitudinal axis of the input mix chamber passageway.

Yet another aspect of the present invention is to provide a method of mixing a first fluid and a second fluid in a mixing head assembly. The method includes providing the mixing head assembly with a housing having an input mix chamber passageway and an output passageway, with the input mix chamber passageway communicating with the output passageway. The method also includes angling the input mix chamber passageway relative to the output passageway at a non-perpendicular angle, injecting the first fluid into the input mix chamber passageway through a first nozzle of a first input, injecting the second fluid into the input mix chamber passageway and mixing the first fluid with the second fluid to form a mixed fluid.

In yet another aspect of the present invention, a method of mixing a first fluid and a second fluid in a mixing head assembly is provided. The method includes providing the mixing head assembly with a housing having an input mix chamber passageway and an output passageway, with the input mix chamber passageway communicating with the output passageway. The method also includes injecting the first fluid along a first axial line into the input mix chamber passageway through a first nozzle, injecting the second fluid along a second axial line into the input mix chamber passageway through a second nozzle and mixing the first fluid with the second fluid to form a mixed fluid at an intersection point. The method further includes positioning the first axial line and the second axial line along lines that are not co-linear, positioning the first axial line and the second axial line along lines that are not co-planar, and positioning the intersection point at a position spaced from a longitudinal axis of the input mix chamber passageway.

Another aspect of the present invention is to provide a mixing head assembly comprising a housing having an input mix chamber passageway and an output passageway, with the input mix chamber passageway communicating with the output passageway. The mixing head assembly also includes a first nozzle for injecting a first fluid into the input mix chamber passageway, with the first nozzle being configured to inject the first fluid into the input mix chamber passageway along a first axial line. The mixing head assembly further includes a second nozzle for injecting a second fluid into the input mix chamber passageway whereby the second fluid can mix with the first fluid to form a mixed fluid, with the second nozzle being configured to inject the second fluid into the input mix chamber passageway along a second axial line. The input mix chamber passageway is non-perpendicular to the output passageway. The first nozzle and the second nozzle are configured to inject the first fluid and the second fluid into the input mix chamber passageway such that the first fluid and the second fluid meet at an intersection point. The first axial line and the second axial line are neither co-linear nor co-planar. Furthermore, the intersection point is not located along a longitudinal axis of the input mix chamber passageway.

Yet another aspect of the present invention is to provide a method of mixing polyol and isocyanate in a mixing head assembly. The method includes providing the mixing head assembly with a housing having an input mix chamber passageway and an output passageway, with the input mix chamber passageway communicating with the output passageway. The method also includes angling the input mix chamber passageway relative to the output passageway at a non-perpendicular angle, injecting the polyol along a first axial line into the input mix chamber passageway through a first nozzle, injecting the isocyanate along a second axial line into the input mix chamber passageway through a second nozzle, and mixing the polyol with the isocyanate to form polyurethane foam at an intersection point. The method further includes positioning the first axial line and the second axial line along lines that are not co-linear, positioning the first axial line and the second axial line along lines that are not co-planar, and positioning the intersection point at a position spaced from a longitudinal axis of the input mix chamber passageway.

These and other features, advantages, and objects of the present invention will be further understood and appreciated by those skilled in the art by reference to the following specification, claims and appended drawings.

DETAILED DESCRIPTION OF THE PREFERRED EMBODIMENTS

Figure 1:
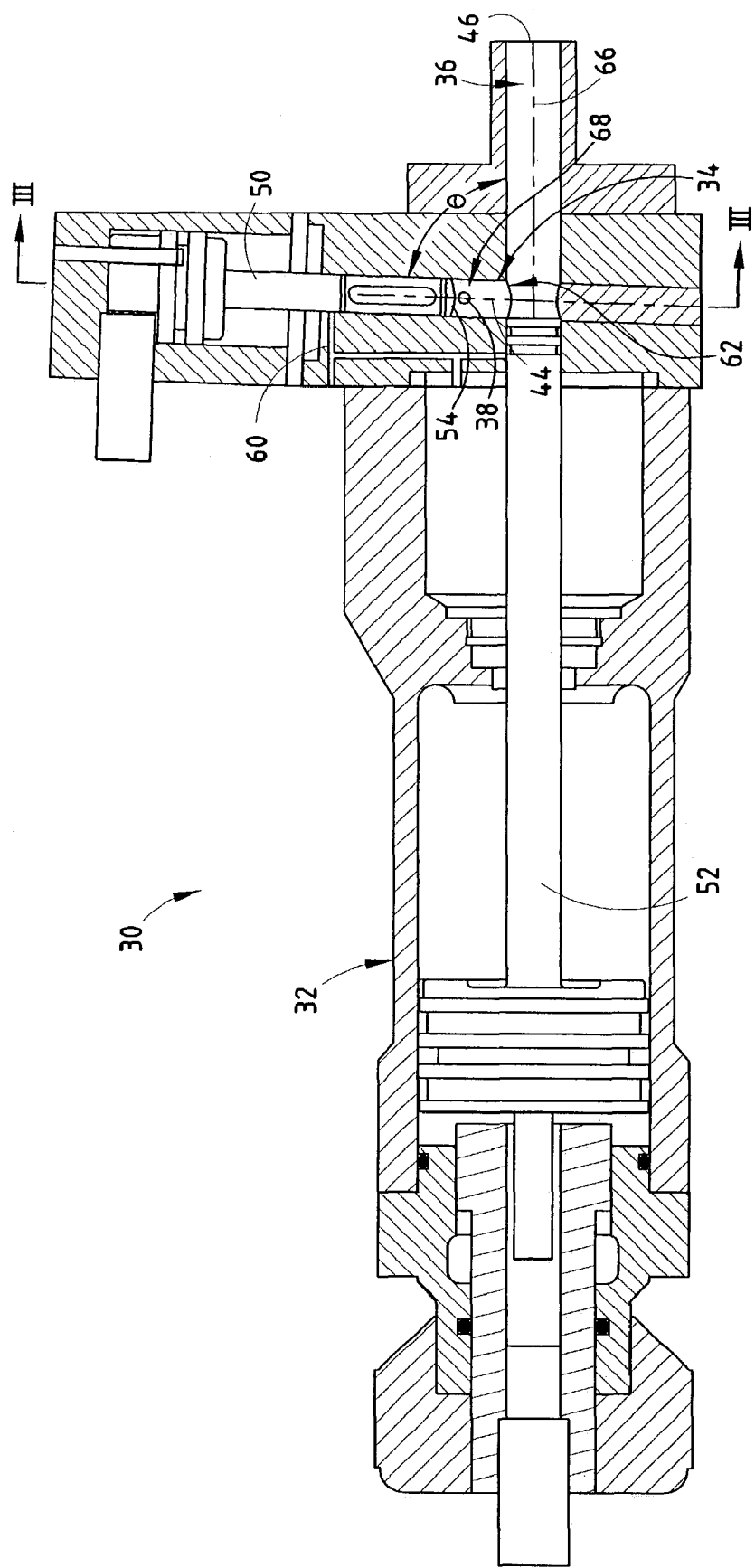
FIG. 1 is a cross-sectional view of a mixing head assembly embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 30 (FIG. 1) generally designates a mixing head assembly embodying the present invention. In the illustrated example, the mixing head assembly 30 comprises a housing 32 having an input mix chamber passageway 34 and an output passageway 36, with the input mix chamber passageway 34 communicating with the output passageway 36. The mixing head assembly 30 also includes a first input 38 for injecting a first fluid into the input mix chamber passageway 34, with the first input 38 including a first nozzle 40 configured to inject the first fluid into the input mix chamber passageway 34. The mixing head assembly 30 further includes a second input 42 for injecting a second fluid into the input mix chamber passageway 34, whereby the second fluid can mix with the first fluid to form a mixed fluid. In a first preferred embodiment, the input mix chamber passageway 34 is non-perpendicular to the output passageway 36. Alternatively, in a second preferred embodiment, or in addition to the first preferred embodiment, an intersection point of the first fluid and the second fluid is not located along a longitudinal or input axis 44 of the input mix chamber passageway 34.

The illustrated mixing head assembly 30 includes the housing 32 for mixing the first fluid and the second fluid. Preferably, the first and second fluids are polyol and isocyanate. The polyol and isocyanate are preferably mixed to form polyurethane foam. However, it is contemplated that the first fluid and the second fluid could be any fluids to be mixed for any purpose. The housing 32 of the mixing head assembly 30 includes a discharge outlet 46 at an end of the outlet passageway 36. Once the first fluid and the second fluid are mixed in the housing 32, the mixed fluid is pushed out of the discharge outlet 46. Preferably, the discharge outlet 46 is connected to the mold (not shown), whereby the mixed fluid is pushed into the mold after the mixed fluid is mixed.

In the illustrated example, the first fluid and the second fluid are initially introduced into the input mix chamber passageway 34 through the first input 38 and the second input 42, respectively. The first input 38 includes the first nozzle 40 for injecting the first fluid into the input mix chamber passageway 34. Furthermore, the second input 42 preferably includes a second nozzle 48 for injecting the second fluid into the input mix chamber passageway 34. However, it is contemplated that the second fluid could be introduced into the input mix chamber passageway 34 by other means. The first fluid and the second fluid are preferably stored separately in tanks (not shown) and are preferably pumped into the first input 38 and the second input 42 during the mixing process.

Figure 3:
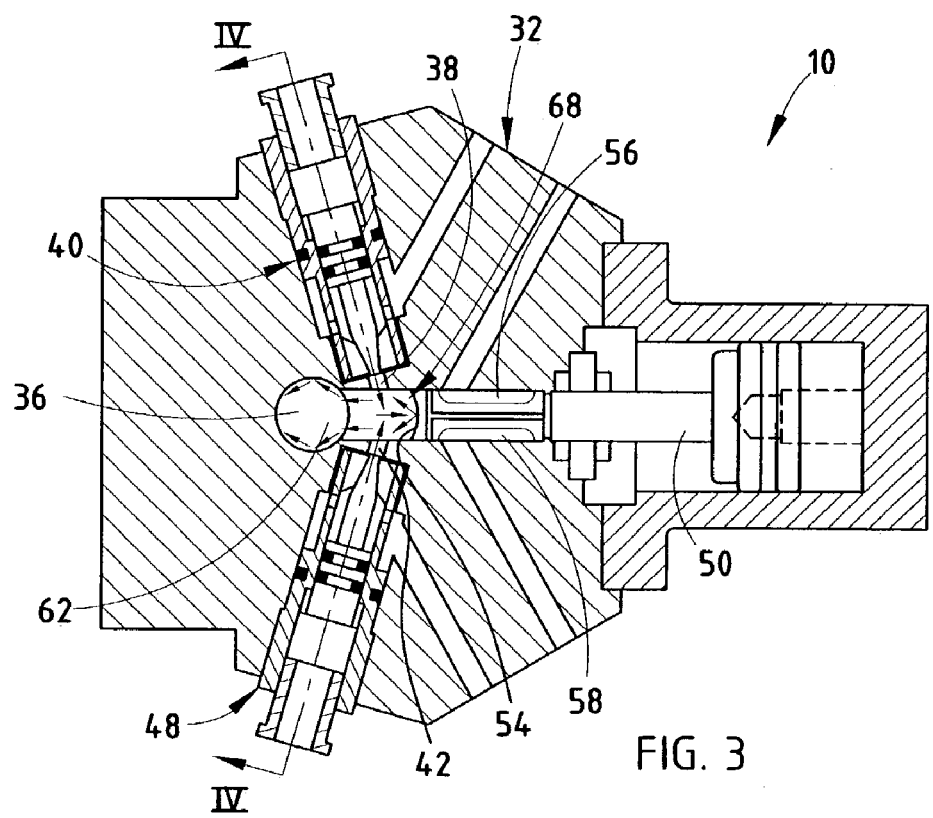
FIG. 3 is a cross-sectional view of the mixing head assembly embodying the present invention taken along the line III—III of FIG. 1.

The illustrated housing 32 of the mixing head assembly 30 includes a mixing chamber piston rod 50 and a cleanout piston rod 52 for assisting in pushing the last of the mixed fluid into the mold. The mixing chamber piston rod 50 is configured to slide within the input mix chamber passageway 34 and the cleanout piston rod 52 is configured to slide within the outlet passageway 36. After the first fluid and the second fluid are injected into the input mix chamber passageway 34 to form the mixed fluid during a mixing cycle, the mixed fluid will flow from the input mix chamber passageway 34 to the outlet passageway 36 and into the mold. When all of the mixed fluid to be placed into the mold is within all three of the mold, the outlet passageway 36 and the input mix chamber passageway 34 at the end of a timed mixed cycle, then the mixing chamber piston rod 50 is extended past the first input 38 and the second input 42 to stop the injection of the first fluid and the second fluid into the input mix chamber passageway 34 and to push the mixed fluid out of the input mix chamber passageway 34 into the outlet passageway 36. The mixing chamber piston rod 50 preferably includes an end 54 being convex as seen from the side (FIG. 1) and concave as seen from above (FIG. 3). The mixing chamber piston rod 50 also preferably includes a first recycle channel 56 allowing the first fluid to recycle to a first storage tank holding the first fluid and a second recycle channel 58 allowing the second fluid to recycle to a second storage tank holding the second fluid as the mixing chamber piston rod 50 covers the first input 38 and the second input 42. After the mixing chamber piston rod 50 has slid through the input mix chamber passageway 34 to push all of the mixed fluid into the outlet passageway 36, the cleanout piston rod 52 slides through the outlet passageway 36 to push the mixed fluid out of the discharge outlet 46. The housing 32 preferably includes a lubricant passage 60 for supplying lubricant to form a lubricating film on the mixing chamber piston rod 50 and the cleanout piston rod 52, thereby allowing the mixing chamber piston rod 50 and the cleanout piston rod 52 to easily slide within the input mix chamber passageway 34 and the outlet passageway 36, respectfully, and also preventing the mixed fluid from adhering to the surfaces of the mixing chamber piston rod 50 and the cleanout piston rod 52.

In the illustrated example, the input mix chamber passageway 34 is preferably non-perpendicular to the output passageway 36. A meeting area 62 defines the intersection of the input mix chamber passageway 34 and the outlet passageway 36. Preferably, the mixed fluid flows in a turbulent flow in the input mix chamber passageway 34 and then flows in a smooth laminar flow after the mixed fluid passes the meeting area 62 and before the mixed fluid is discharged from the outlet passageway 36. In a preferred embodiment, both the outlet passageway 36 and the input mix chamber passageway 34 have an annular cross section. Furthermore, the input mix chamber passageway 34 includes the input axis 44 and the outlet passageway 36 includes an outlet axis 66. Making the input mix chamber passageway 34 and the outlet passageway 36 non-perpendicular improve the mixing of the first fluid and the second fluid. Therefore, an angle $\theta$ between the input axis 44 and the outlet axis 66 is non-perpendicular. Preferably, the angle $\theta$ is from about 89° to about 80°. Most preferably, the angle $\theta$ is about 88°. However, an angle of 89° may be preferred because of manufacturing costs associated with creating a housing 32 with a larger angle $\theta$. Furthermore, the mixed fluid preferably flows in a direction away from the discharge outlet 46 as the mixed fluid enters the meeting area 62. Therefore, the angle $\theta$ between the input mix chamber passageway 34 and the outlet passageway 36, defined by the discharge outlet 46, the meeting area 62 and a mixing area 68 where the first fluid and the second fluid meet, is acute.

Figure 4:
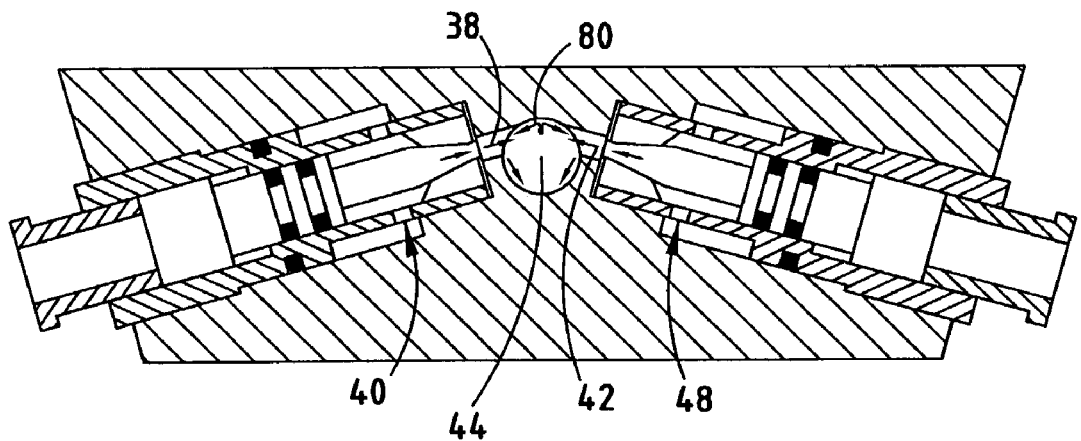
FIG. 4 is a cross-sectional view of the mixing head assembly embodying the present invention taken along the line IV—IV of FIG. 3.

The illustrated first nozzle 40 and the second nozzle 48 are neither non-linear nor non-planar to improve the mixing of the first fluid and the second fluid. The first fluid exits the first nozzle 40 along a first axial line and the second fluid exits the second nozzle 48 along a second axial line. The first axial line and the second axial line are not co-linear as illustrated in FIG. 4. Furthermore, the first axial line and the second axial line are not co-planar as illustrated in FIG. 3.

Preferably, an angle between the first axial line and a line perpendicular to both the input axis 44 and outlet axis 66 is between about 14° and 20°. More preferably, the angle between the first axial line and the line perpendicular to both the input axis 44 and outlet axis 66 is between about 15.793° and 18.371°. Most preferably, the angle between the first axial line and the line perpendicular to both the input axis 44 and outlet axis 66 is about 18.371°. Additionally, an angle between the second axial line and the line perpendicular to both the input axis 44 and outlet axis 66 is preferably between about 14° and 20°. More preferably, the angle between the second axial line and the line perpendicular to both the input axis 44 and outlet axis 66 is between about 15.793° and 18.371°. Most preferably, the angle between the second axial line and the line perpendicular to both the input axis 44 and outlet axis 66 is about 18.371°.

In the preferred embodiment, an angle between the first axial line and the input axis 44 is between about 71° and 77°. More preferably, the angle between the first axial line and the input axis 44 is between about 75.058° and 72.832°. Most preferably, the angle between the first axial line and the input axis 44 is about 72.832°. Additionally, an angle between the second axial line and the input axis 44 is preferably between about 71° and 77°. More preferably, the angle between the second axial line and the input axis 44 is between about 75.058° and 72.832°. Most preferably, the angle between the second axial line and the input axis 44 is about 72.832°.

Moreover, in the preferred embodiment, an angle between the first axial line and the outlet axis 66 is between about 71° and 77°. More preferably, the angle between the first axial line and the outlet axis 66 is between about 75.058° and 72.832°. Most preferably, the angle between the first axial line and the outlet axis 66 is about 72.832°. Additionally, an angle between the second axial line and the outlet axis 66 is preferably between about 71° and 77°. More preferably, the angle between the second axial line and the outlet axis 66 is between about 75.058° and 72.832°. Most preferably, the angle between the second axial line and the outlet axis 66 is about 72.832°.

Figure 2:
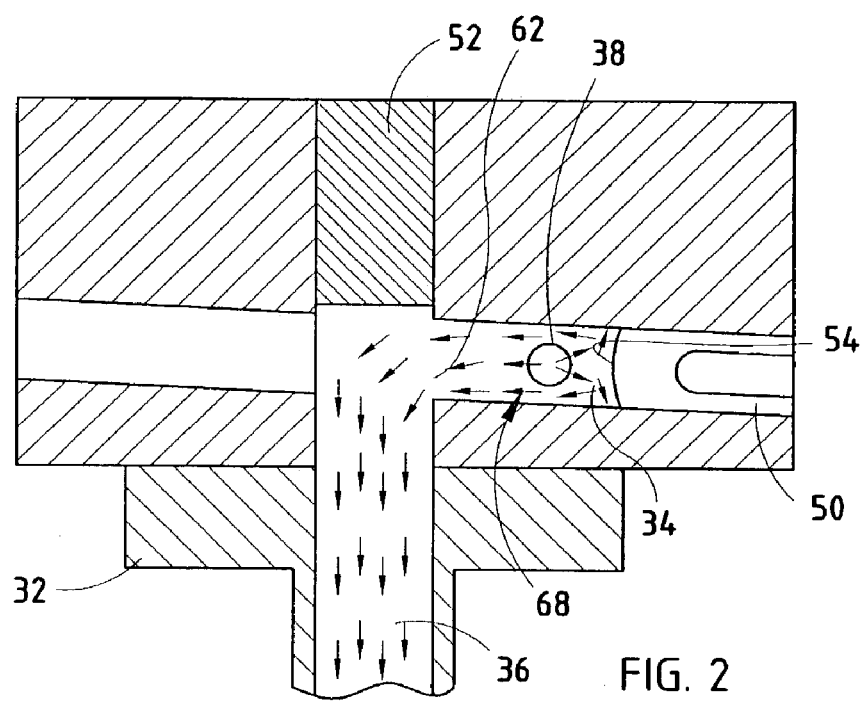
FIG. 2 is a partial cross-sectional view of the mixing head assembly embodying the present invention.

Furthermore, in the preferred embodiment, the first axial line and the second axial line do not meet at the input axis 44 to assist in mixing the first fluid and the second fluid. Therefore, the first fluid and the second fluid enter the input mix chamber passageway 34 along the first axial line and the second axial line, respectively, and impinge primarily upon each other, thereby causing a mixing of the first fluid and the second fluid at an intersection point 80 to form the mixed fluid. The intersection point 80 is not located along the input axis 44. The mixed fluid will then also impinge against a wall of the input mix chamber passageway 34. If the wall of the input mix chamber passageway 34 is concave at the point that the mixed fluid impinges against the wall, the wall will cause the impinged mixed fluid to flow in opposite direction out from the point that the mixed fluid impinges the wall and along the wall as illustrated in FIG. 4, thereby forming a first swirl due to the impinging energy. Since the intersection point 80 is not co-linear with the input axis 64, the mixed fluid will hit the wall of the input mix chamber passageway 34 with a force greater than if the intersection point was co-linear with the input axis 64, thereby causing an improved mixing of the first fluid and the second fluid. The mixed fluid will also move towards the end 54 of the mixing chamber piston rod 50 and impinge against the end 54 of the mixing chamber piston rod 50 for a second swirl. As more mixed fluid is forced into the input mix chamber passageway 34, the mixed fluid impinging against the end 54 of the mixing chamber piston rod 50 must pass through the first fluid entering the input mix chamber passageway 34 through the first input 38 and the second fluid entering the input mix chamber passageway 34 through the second input 42 as illustrated in FIGS. 2 and 3, thereby creating additional turbulence in the mixed fluid and thereby improving the mixing of the first fluid with the second fluid.

In the illustrated mixing head assembly, the angle between the input mix chamber passageway and the outlet passageway improves the mixing of the first fluid and the second fluid, thereby improving the mixing of the mixed fluid and thereby creating a more homogenous mixed fluid. Furthermore, by placing the intersection point of the first fluid and the second fluid off center of the input axis 44 of the input mix chamber passageway, the mixing of the first fluid and the second fluid is improved, thereby improving the mixing of the mixed fluid and thereby creating a more homogenous mixed fluid. A line perpendicular to the first axial line is not parallel to a longitudinal axis of the input mix chamber passageway and a line perpendicular to the second axial line is not parallel to the longitudinal axis of the input mix chamber passageway. Therefore, providing the angle between the input mix chamber passageway and the outlet passageway and placing the intersection point of the first fluid and the second fluid off center of the input axis 44 of the input mix chamber passageway each will significantly improve the mixing of the first fluid and the second fluid individually. Furthermore, a combination of both will combine the improved mixing characteristics of the mixed fluid.

Figure 4A:
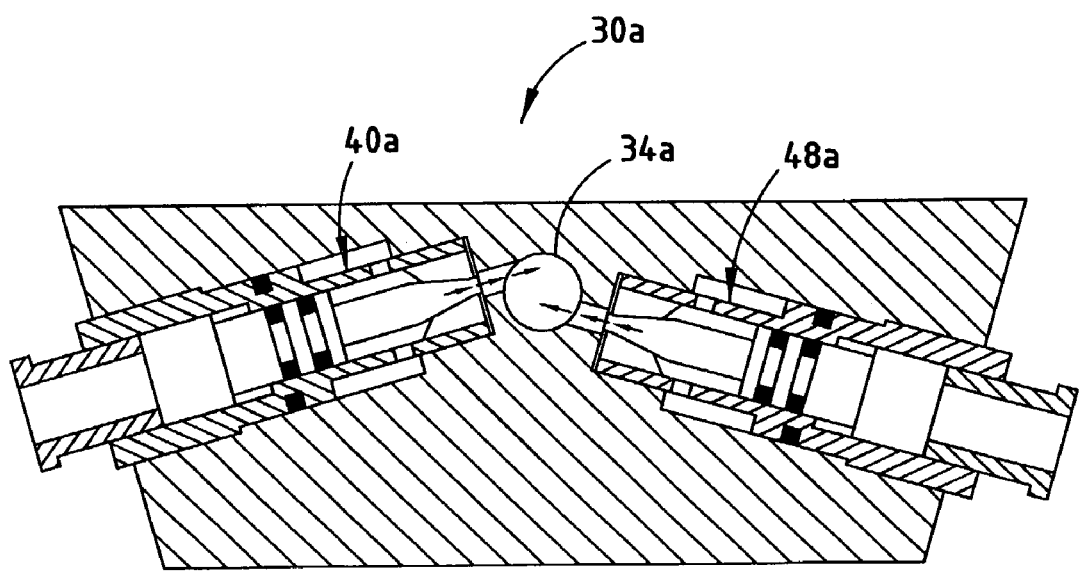
FIG. 4A is cross-sectional view of a mixing head assembly embodying a second embodiment of the present invention.
Figure 5:
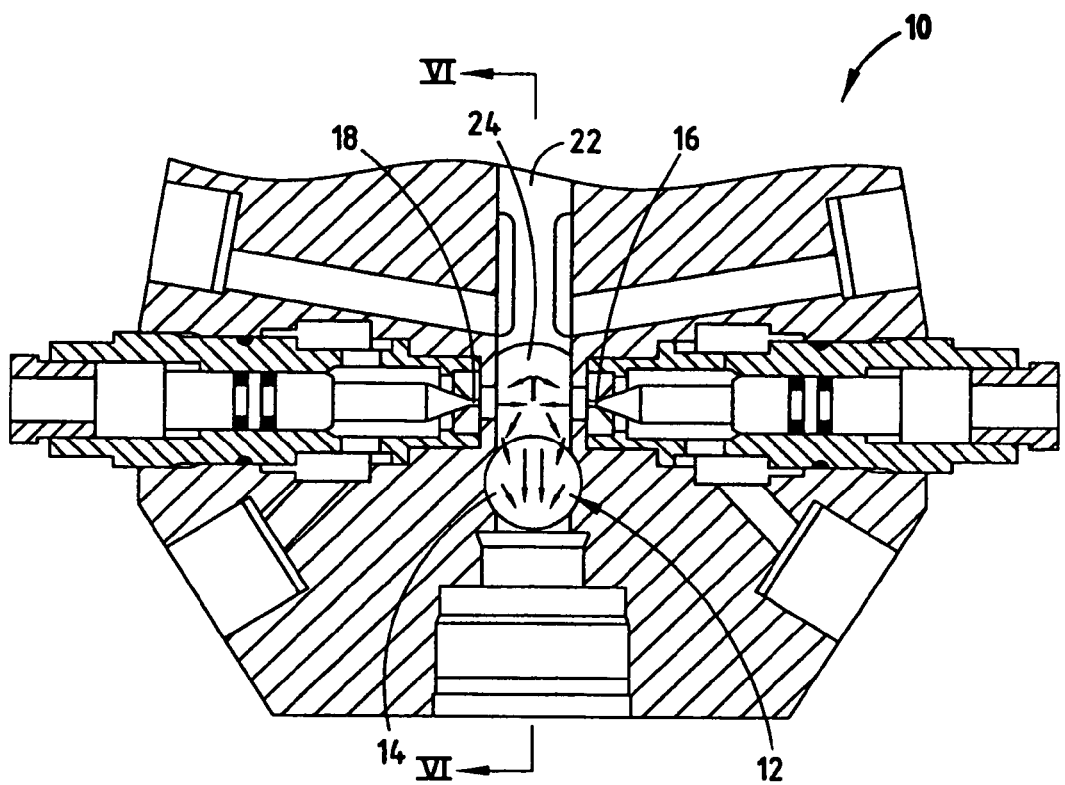
FIG. 5 is a cross-sectional view of a typical mixing head assembly.
Figure 6:
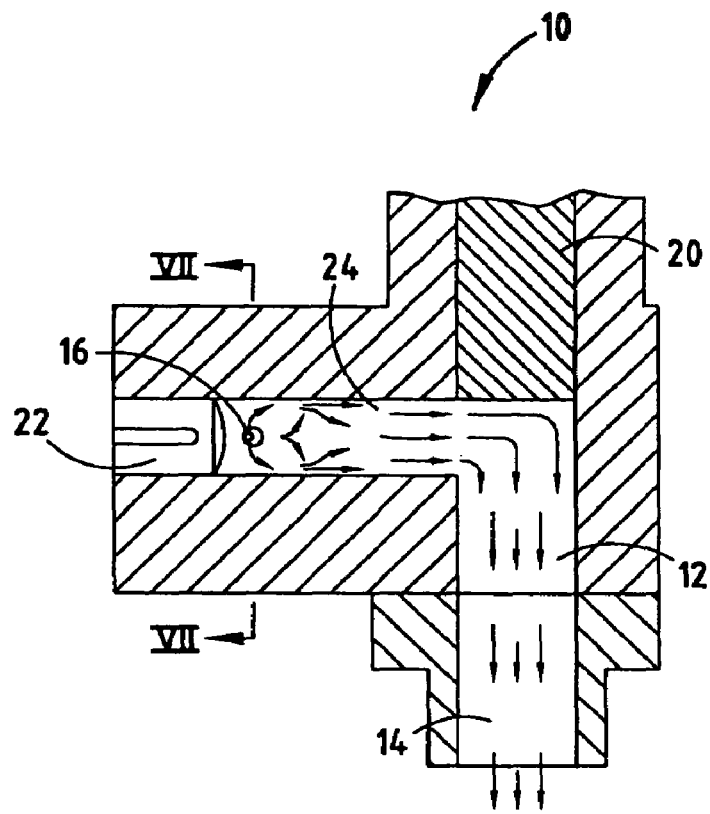
FIG. 6 is a cross-sectional view of the typical mixing head assembly of FIG. 5 taken along the line VI—VI of FIG. 5.
Figure 7:
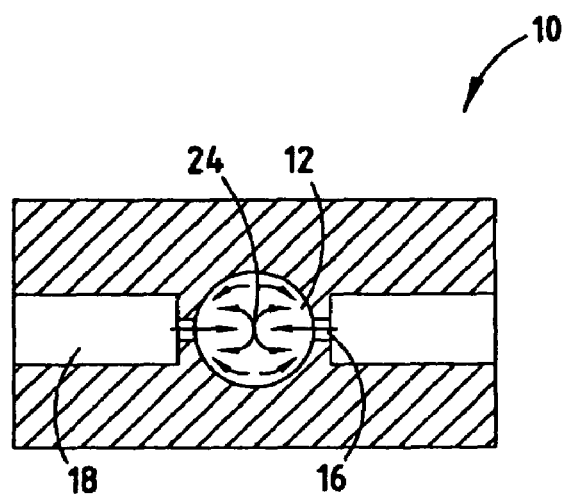
FIG. 7 is a cross-sectional view of the typical mixing head assembly of FIG. 5 taken along the line VII—VII of FIG. 6.

FIG. 4A illustrates a second embodiment of the mixing head assembly 30a of the present invention. Since mixing head assembly 30a is similar to the previously described mixing head assembly 30, similar parts appearing in FIGS. 1–4 and FIG. 4A, respectively, are represented by the same, corresponding reference number, except for the suffix "a" in the numerals of the latter. In the mixing head assembly 30a, the first nozzle 40a inputs the first fluid along first axial line above the center of the input mix chamber passageway 34a and the second nozzle 48a inputs the second fluid along the second axial line below the center of the input mix chamber passageway 34a. Accordingly, the first fluid and the second fluid will rotate in a circular fashion in the input mix chamber passageway 34a moving towards the end of the mixing chamber piston rod. As the mixed fluid returns through the input mix chamber passageway toward the output passageway and after the mixed fluid has contacted the end of the mixing chamber piston rod, the first fluid and the second fluid will be further mixed as the first fluid and the second fluid cross the first axial line and the second axial line.

In the forgoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. A mixing head assembly comprising:
   a housing having an input mix chamber passageway and an output passageway, the input mix chamber passageway communicating with the output passageway;
   a first input for injecting a first fluid into the input mix chamber passageway, the first input including a first nozzle configured to inject the first fluid into the input mix chamber passageway; and
   a second input for injecting second fluid into the input mix chamber passageway whereby the second fluid can mix with the first fluid to form a mixed fluid;
   the input mix chamber passageway including an input annular cross section with an input axis; and
   the outlet passageway including an outlet annular cross section with an outlet axis;
   wherein an angle between the input axis and the outlet axis is from about 89° to about 80°;
   the second input includes a second nozzle configured to inject the second fluid into the input mix chamber passageway;
   the first nozzle is configured to inject the first fluid into the input mix chamber passageway along a first axial line;
   the second nozzle is configured to inject the second fluid into the input mix chamber passageway along a second axial line; and
   the first axial line and the second axial line are not co-linear; and
   a line perpendicular to the first axial line is not parallel to a longitudinal axis of the input mix chamber passageway and a line perpendicular to the second axial line is not parallel to the longitudinal axis of the input mix chamber passageway.

2. The mixing head assembly of claim 1, wherein:
   the first nozzle and the second nozzle are configured to inject the first fluid and the second fluid into the input mix chamber passageway such that the first fluid and the second fluid meet at an intersection point; and the intersection point is not located along the longitudinal axis of the input mix chamber passageway.

3. The mixing head assembly of claim 2, wherein:

the first nozzle is configured to inject the first fluid to mix with the second fluid before either the first fluid or the second fluid enters the output passageway.

4. The mixing head assembly of claim 2, wherein:

the first fluid and the second fluid join the input mix chamber passageway in an area of the input mix chamber passageway that has a single diameter.

5. A mixing head assembly comprising:

a housing having an input mix chamber passageway and an output passageway, the input mix chamber passageway communicating with the output passageway;

a first nozzle for injecting a first fluid into the input mix chamber passageway; and a second nozzle for injecting a second fluid into the input mix chamber passageway whereby the second fluid can mix with the first fluid to form a mixed fluid;

the first nozzle being configured to inject the first fluid into the input mix chamber passageway along a first axial line;

the second nozzle being configured to inject the second fluid into the input mix chamber passageway along a second axial line;

wherein the first nozzle and the second nozzle are configured to inject the first fluid and the second fluid into the input mix chamber passageway such that the first fluid and the second fluid meet at an intersection point; and wherein the first axial line and the second axial line are not co-linear;

wherein a line perpendicular to the first axial line is not parallel to a longitudinal axis of the input mix chamber passageway and a line perpendicular to the second axial line is not parallel to the longitudinal axis of the input mix chamber passageway; and wherein the intersection point is not located along the longitudinal axis of the input mix chamber passageway.

6. The mixing head assembly of claim 5, wherein:

the input mix chamber passageway is non-perpendicular to the output passageway.

7. The mixing head assembly of claim 6, wherein:

the input mix chamber passageway includes an input annular cross section with an input axis; and the outlet passageway includes an outlet annular cross section with an outlet axis.

8. The mixing head assembly of claim 7, wherein:

an angle between the input axis and the outlet axis is from about 89° to about 80°.

9. The mixing head assembly of claim 8, wherein:

the angle between the input axis and the outlet axis is about 88°.

10. The mixing head assembly of claim 5, further including:

a cleanout piston rod located in the outlet passageway configured to slide within the outlet passageway to push the mixed fluid in the outlet passageway out of the outlet passageway.

11. The mixing head assembly of claim 5, further including:

a mixing chamber piston rod located in the input mix chamber passageway configured to slide within the input mix chamber passageway to push all of the mixed fluid in all of the input mix chamber passageway out of the input mix chamber passageway and into the outlet passageway.

12. The mixing head assembly of claim 5, wherein:

the housing includes a discharge outlet at an end of the outlet passageway;

the input mix chamber passageway meets the outlet passageway at a meeting area;

the first fluid mixes with the second fluid at a mixing area; and an angle between the input mix chamber passageway and the outlet passageway defined by the discharge outlet, the meeting area and the mixing area is acute.

13. The mixing head assembly of claim 12, wherein:

the angle between the input mix chamber passageway and the outlet passageway is from about 89° to about 80°.

14. The mixing head assembly of claim 13, wherein:

the angle between the input mix chamber passageway and the outlet passageway is about 88°.

15. The mixing head assembly of claim 5, wherein:

the first nozzle is configured to inject the first fluid to mix with the second fluid before either the first fluid or the second fluid enters the output passageway.

16. The mixing head assembly of claim 5, wherein:

the first fluid and the second fluid join the input mix chamber passageway in an area of the input mix chamber passageway that has a single diameter.

17. A method of mixing a first fluid and a second fluid in a mixing head assembly comprising:

providing the mixing head assembly with a housing having an input mix chamber passageway and an output passageway, the input mix chamber passageway communicating with the output passageway;

injecting the first fluid into the input mix chamber passageway through a first nozzle of a first input;

injecting the second fluid into the input mix chamber passageway;

mixing the first fluid with the second fluid to form a mixed fluid;

providing the input mix chamber passageway with an input annular cross section having an input axis;

providing the outlet passageway with an outlet annular cross section having an outlet axis; and angling the input axis and the outlet axis from about 89° to about 80°, injecting the second fluid includes injecting the second input through a second nozzle, injecting the first fluid comprises injecting the first fluid into the input mix chamber passageway along a first axial line; and injecting the second fluid comprises injecting the second fluid into the input mix chamber passageway along a second axial line; and further including positioning the first axial line and the second axial line along lines that are not co-linear; and positioning the first axial line and the second axial line to be non-parallel to a line perpendicular to a longitudinal axis of the input mix chamber passageway.

18. The method of mixing of claim 17, wherein:

the first fluid and the second fluid meet at an intersection point; and further including positioning the intersection point at a position spaced from the longitudinal axis of the input mix chamber passageway.

19. The method of mixing of claim 18, further including:

moving a mixture of the first fluid and the second fluid to the output passageway;

wherein mixing the first fluid and the second fluid takes place before moving the mixture.

20. The method of mixing of claim 18, further including:
joining the first fluid and the second fluid in an area of the input mix chamber passageway having a single diameter.

21. A method of mixing a first fluid and a second fluid in a mixing head assembly comprising:
providing the mixing head assembly with a housing having an input mix chamber passageway and an output passageway, the input mix chamber passageway communicating with the output passageway;
injecting the first fluid along a first axial line into the input mix chamber passageway through a first nozzle;
injecting the second fluid along a second axial line into the input mix chamber passageway through a second nozzle;
mixing the first fluid with the second fluid to form a mixed fluid at an intersection point;
positioning the first axial line and the second axial line along lines that are not co-linear;
positioning the first axial line and the second axial line to be non-parallel to a line perpendicular to a longitudinal axis of the input mix chamber passageway; and
positioning the intersection point at a position spaced from the longitudinal axis of the input mix chamber passageway.

22. The method of mixing of claim 21, further including:
angling the input mix chamber passageway relative to the output passageway at a non-perpendicular angle.

23. The method of mixing of claim 22, wherein:
the input mix chamber passageway includes an input annular cross section with an input axis; and
the outlet passageway includes an outlet annular cross section with an outlet axis.

24. The method of mixing of claim 23, wherein:
angling the input mix chamber passageway relative to the output passageway at a non-perpendicular angle includes angling the input axis and the outlet axis at the non-perpendicular angle, the non-perpendicular angle being from about 89° to about 80°.

25. The method of mixing of claim 24, wherein:
the non-perpendicular angle is about 88°.

26. The method of mixing of claim 22, wherein:
the housing includes an discharge outlet at an end of the outlet passageway;
the input mix chamber passageway meets the outlet passageway at a meeting area;
the first fluid mixes with the second fluid at a mixing area; and
angling the input mix chamber passageway relative to the output passageway at the non-perpendicular angle comprises angling the input mix chamber passageway relative to the outlet passageway such that an exchange angle between the input mix chamber passageway and the outlet passageway defined by the discharge outlet;
the meeting area and the mixing area is acute.

27. The method of mixing of claim 26, wherein:
the exchange angle is from about 89° to about 80°.

28. The method of mixing of claim 27, wherein:
the exchange angle is about 88°.

29. The method of mixing of claim 21, further including:
providing the housing with a cleanout piston rod located in the outlet passageway; and
sliding the cleanout piston rod within the outlet passageway.

30. The method of mixing of claim 29, further including:
pushing the mixed fluid in the outlet passageway out of the outlet passageway.

31. The method of mixing of claim 21, further including:
providing the housing with a mixing chamber piston rod located in the input mix chamber passageway; and
sliding the mixing chamber piston rod within the input mix chamber passageway.

32. The method of mixing of claim 31, further including:
pushing all of the mixed fluid in the input mix chamber passageway out of all of the input mix chamber passageway and into the outlet passageway with the mixing chamber piston rod.

33. The method of mixing of claim 21, wherein:
the first fluid is polyol and the second fluid is isocyanate.

34. The method of mixing of claim 21, further including:
moving a mixture of the first fluid and the second fluid to the output passageway;
wherein mixing the first fluid and the second fluid takes place before moving the mixture.

35. The method of mixing of claim 21, further including:
joining the first fluid and the second fluid in an area of the input mix chamber passageway having a single diameter.

36. A mixing head assembly comprising:
a housing having an input mix chamber passageway and an output passageway, the input mix chamber passageway communicating with the output passageway;
a first nozzle for injecting a first fluid into the input mix chamber passageway, the first nozzle being configured to inject the first fluid into the input mix chamber passageway along a first axial line; and
a second nozzle for injecting a second fluid into the input mix chamber passageway whereby the second fluid can mix with the first fluid to form a mixed fluid, the second nozzle being configured to inject the second fluid into the input mix chamber passageway along a second axial line;
wherein the input mix chamber passageway is non-perpendicular to the output passageway;
wherein the first nozzle and the second nozzle are configured to inject the first fluid and the second fluid into the input mix chamber passageway such that the first fluid and the second fluid meet at an intersection point;
wherein the first axial line and the second axial line are not co-linear;
wherein a line perpendicular to the first axial line is not parallel to a longitudinal axis of the input mix chamber passageway and a line perpendicular to the second axial line is not parallel to the longitudinal axis of the input mix chamber passageway; and
wherein the intersection point is not located along the longitudinal axis of the input mix chamber passageway.

37. A method of mixing polyol and isocyanate in a mixing head assembly comprising:
providing the mixing head assembly with a housing having an input mix chamber passageway and an output passageway, the input mix chamber passageway communicating with the output passageway;
angling the input mix chamber passageway relative to the output passageway at a non-perpendicular angle;
injecting the polyol along a first axial line into the input mix chamber passageway through a first nozzle;
injecting the isocyanate along a second axial line into the input mix chamber passageway through a second nozzle;

mixing the polyol with the isocyanate to form polyurethane foam at an intersection point;

positioning the first axial line and the second axial line along lines that are not co-linear;

positioning the first axial line and the second axial line to be non-parallel to a line perpendicular to a longitudinal axis of the input mix chamber passageway; and positioning the intersection point at a position spaced from the longitudinal axis of the input mix chamber passageway.

38. A mixing head assembly comprising:

a housing having a passageway;

a first nozzle for injecting a first fluid into the passageway; and a second nozzle for injecting a second fluid into the passageway whereby the second fluid can mix with the first fluid to form a mixed fluid;

the first nozzle being configured to inject the first fluid into the passageway along a first axial line;

the second nozzle being configured to inject the second fluid into the passageway along a second axial line;

wherein the first nozzle and the second nozzle are configured to inject the first fluid and the second fluid into the passageway such that the first fluid and the second fluid meet at an intersection point; and wherein the first axial line and the second axial line are not co-linear;

wherein a line perpendicular to the first axial line is not parallel to a longitudinal axis of the input mix chamber passageway and a line perpendicular to the second axial line is not parallel to the longitudinal axis of the input mix chamber passageway; and wherein the intersection point is not located along the longitudinal axis of the passageway.

39. A method of mixing a first fluid and a second fluid in a mixing head assembly comprising:

providing the mixing head assembly with a housing having a passageway;

injecting the first fluid along a first axial line into the passageway through a first nozzle;

injecting the second fluid along a second axial line into the passageway through a second nozzle;

mixing the first fluid with the second fluid to form a mixed fluid at an intersection point;

positioning the first axial line and the second axial line along lines that are not co-linear;

positioning the first axial line and the second axial line to be non-parallel to a line perpendicular to a longitudinal axis of the input mix chamber passageway; and positioning the intersection point at a position spaced from the longitudinal axis of the passageway.

* * * * *

UNITED STATES PATENT AND TRADEMARK OFFICE
CERTIFICATE OF CORRECTION

| | | |
|---|---|---|
| PATENT NO. | : 7,093,972 B2 | Page 1 of 1 |
| APPLICATION NO. | : 10/600777 | |
| DATED | : August 22, 2006 | |
| INVENTOR(S) | : Gordon W. Breuker et al. | |

It is certified that error appears in the above-identified patent and that said Letters Patent is hereby corrected as shown below:

Column 8
Line 41, "injecting second" should be --injecting a second--.

Signed and Sealed this

Sixth Day of February, 2007

JON W. DUDAS
*Director of the United States Patent and Trademark Office*